July 7, 1942.                J. NEUFELD ET AL                2,288,973
                      WELL SURVEY METHOD AND APPARATUS
                            Filed Dec. 15, 1939
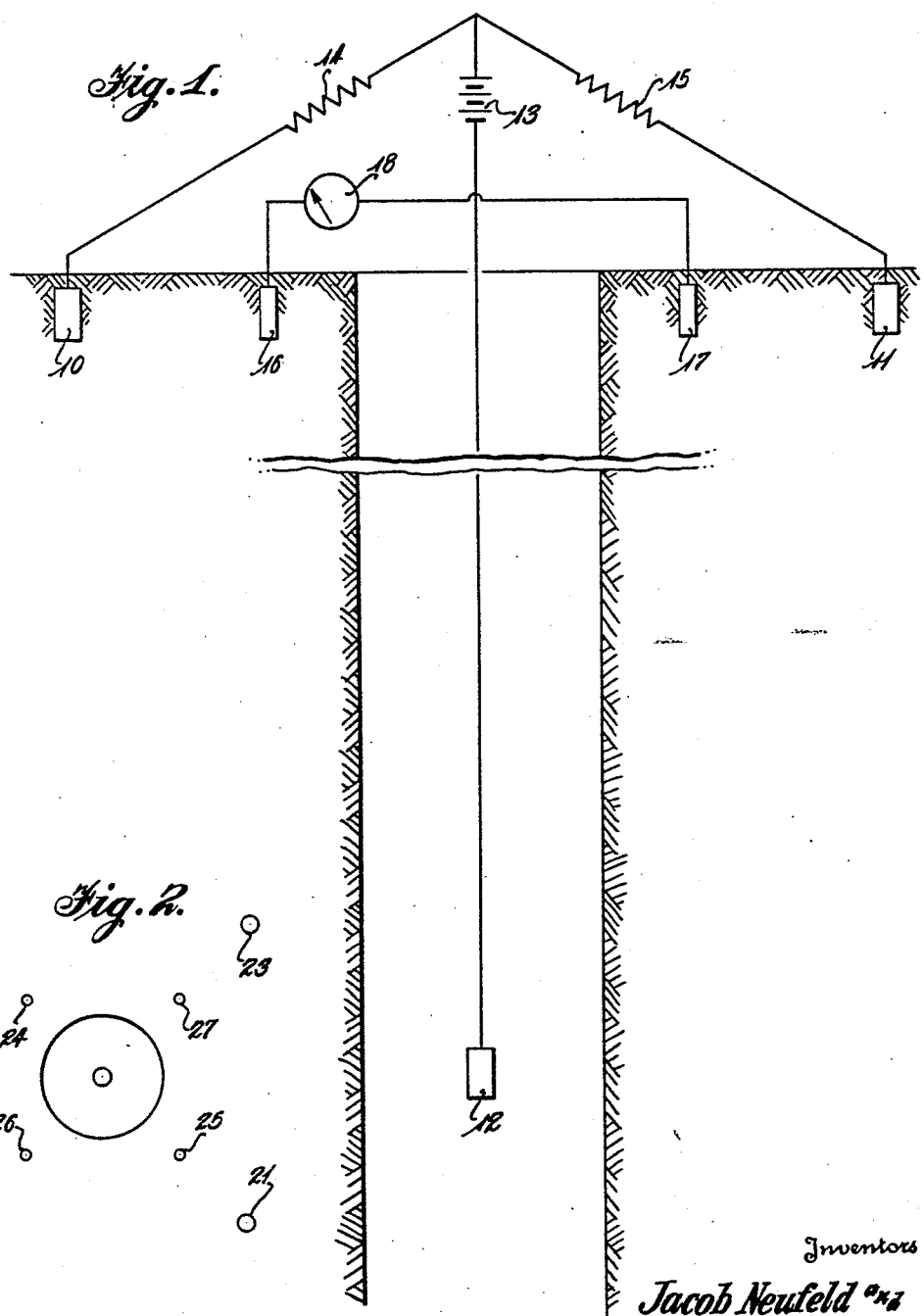
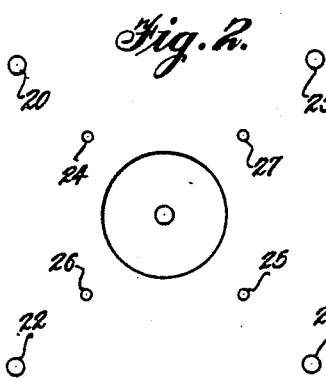
Inventors
Jacob Neufeld and
Elihu Henry Cooley
By Stevens & Davis
       Attorneys Patented July 7, 1942

2,288,973

UNITED STATES PATENT OFFICE 2,288,973

WELL SURVEY METHOD AND APPARATUS

Jacob Neufeld and Elihu Henry Cooley, Tulsa, Okla., assignors to Well Surveys, Incorporated, Tulsa, Okla., a corporation of Delaware Application December 15, 1939, Serial No. 309,476

5 Claims. (Cl. 175—182)

This invention relates to the art of geophysical prospecting and particularly to a method and apparatus to be used in conjunction with a drill hole or other opening in the surface of the earth to obtain information as to the slope and dip of underground strata.

By slope is meant the angle at which a stratum intersects the horizontal plane at a specified point, the angle of intersection being measured in some specified vertical plane. By dip is meant the maximum angle at which the stratum intersects a horizontal plane at a specified point, but measured in any vertical plane. In other words, the slope is measured in a specified vertical plane but the dip is measured in the plane in which the angle is greatest. Thus at any particular point the dip is equal to the maximum slope and the slope generally varies depending upon the vertical reference plane in which it is taken.

The problem of determining the amount and direction of whatever dip exists in the various strata penetrated by a drill hole is of great practical importance because if these facts can be determined they indicate the type of structure penetrated by the well and whether or not the wells have passed through faults or crossed axes of asymmetrical anticlines into areas from which they should be deflected.

When a vertical hole is drilled in sedimentary rock, an examination of the cores recovered usually gives, with sufficient accuracy, the angle of the dip of the beds traversed, that is the maximum angle of inclination to the horizontal plane. It is difficult to determine, however, the direction and the azimuth of the dip, that is, the azimuth in relation to the north, in which is situated the line of greatest slope of the beds, and the direction which must be taken in order to descend this slope. For this determination it is necessary to recover cores oriented in relation to a given vertical plane—the north-south plane for example—and this operation is extremely delicate. In practice, with the mechanical coring devices at present in use, it can only be realized in very shallow drill holes.

Accordingly, several attempts have been made in the past to determine the angle of the dip and the azimuth of the dip of various geological formations traversed by a bore hole by means of a process similar to "electric coring," the said process consisting in performing electrical measurements inside drill holes.

One of these prior attempts is based on the effect of anisotropy of stratified formations and has been described in a publication entitled: "The Electromagnetic Teleclinometer and Dipmeter" by C. and M. Schlumberger and H. G. Doll; presented at the World's Petroleum Congress, July 19–25, 1933. This prior method, however, is not as accurate or reliable as is desirable, because of the mechanical and physical difficulties attendant upon the operation of the delicate and complicated mechanism that is required, and because of the severe conditions attending practical oil work.

It is therefore the purpose of this invention to provide a simple and reliable method and apparatus for determining the magnitude and direction of the slope of strata penetrated by a bore hole with reference to any given plane and by further extension of its principles, the magnitude, azimuth and direction of dip of the various strata.

Briefly, the present invention contemplates the establishment of at least two electrical current fields extending from a point in the drill hole to spaced points on the surface of the earth if the slope only is to be determined and at least three such current fields if the dip is to be studied. The two points on the surface may be arranged equidistantly and in opposite directions from the mouth of the drill hole in the vertical plane of the slope, if slope only is to be determined. With the currents so established, determinations are made by the use of measuring electrodes contacting the ground at intermediate points so as to obtain indications of the configurations of the current patterns in the ground. If the indications of the two current patterns match, the formation included in the fields is indicated to be symmetrical in the plane of the current fields, if not, an asymmetry is indicated to exist the extent and direction of which are indicated by the magnitude of the difference in the indications as will be apparent from the detailed description. In general, if one current field is indicated to be more compact than the other this shows that the more conductive underlying strata slopes upward in that current field, lowering the resistance and in general compacting the field. The extent of the difference indicates the angle of the slope.

If it is desired to go further than merely to determine the direction and magnitude of the slope in a particular plane and to make a determination of the angle, direction and azimuth of the dip as well, this can be accomplished by using at least three current fields so spaced around the drill hole that by a comparison of the indications from the three fields, these facts can be determined. For example, if three fields are evenly distributed around a drill hole and measurements made on all three fields to obtain an indication of the configuration of each of the fields, these indications may then be compared to determine all three facts about the dip, its azimuth, directions and magnitude.

Assuming there is an appreciable dip, one of the three fields will be distinctly more compact or distinctly less compact than the other two and the remaining two fields will either be compact to the same degree, if the azimuth of the dip is in line with the first field, or compact to different degrees if it is not. If the azimuth is in line with the most compact field the direction of ascent will be towards the field from the bore hole and in case it is aligned with the least compact field the direction of ascent will be from the field to the hole. If the azimuth is not in line with one of the fields the direction of ascent will lie between the two more compact fields and closest to the more compact of the two. The exact direction can be obtained by a mathematical comparison of the relative slopes in the three planes. The magnitude of differences in the compacting of the fields is indicative of the magnitude of the dip.

Similar results may be obtained by using four current fields arranged in two pairs of oppositely positioned fields, preferably with the pairs at right angles to each other.

In a practical way the principles of this invention may be accomplished by planting four electrodes equally distant from the mouth of a well and equally spaced around it. A fifth electrode is then lowered into the well and current fields established between each of the four surface electrodes and the one electrode in the well. Measurements indicative of the current flow pattern of each of the four currents are then made and compared either for a single depth, or for a range of depths.

One way of doing this is to initiate a flow of current in one of the four paths at a time and during the flow of current, with the well electrode stationary to measure the potential drop in a fixed relative small length of well bore at various levels in the well bore. Thus, a pair of electrodes spaced a short fixed distance apart may be lowered into the well and a continuous record of the potentials developed between them may be made and this record correlated with a record of the depths of operation. Having made four such records, one for each surface electrode, the records may then be compared to give the desired indication of angle, direction and azimuth of the dip.

Alternatively, and it is believed more desirably, measuring electrodes may be placed in the surface of the earth in the vicinity of each of the main electrodes and the drill hole so that when the current flows from the main electrode on the surface to the electrode in the drill hole, the measuring electrode will have a potential depending upon the potentials of the main electrode and the electrode of the drill hole and upon the characteristics of the intervening earth which affects the current flow pattern between the two electrodes. By connecting the two opposite electrodes to be energized at the same time and then by connecting their respective measuring electrodes together through a galvanometer, the current paths of the two electrodes may be directly compared and in fact all four electrodes may be operated simultaneously with the opposite pairs of measuring electrodes connected together through two galvanometers and indications of the comparison of both pairs of oppositely positioned current flows can be obtained simultaneously. While these are being made, the electrode in the well bore can be raised or lowered and changes noted which will indicate changes in the direction or azimuth of the dip with depth.

For a more complete understanding of the principles and details of this invention reference may be had to the attendant drawing and the following detailed description thereof:

In the drawing:

Figure 1 illustrates diagrammatically the use of the preferred embodiment of this invention on a simplified earth formation to determine slope.

Figure 2 shows the spacing of the electrodes about the mouth of a drill hole to determine the azimuth, direction, and magnitude of the dip.

As shown in Figure 1 the preferred form of this invention as applied to the determination of the slope only, comprises a pair of electrodes 10 and 11, placed in the ground on opposite sides of a well bore, equally spaced therefrom, and electrically connected to a third electrode 12 which is arranged to be movable up and down inside of the well bore. The two electrodes on the surface are connected to one end of a battery or other sources of electrical potential 13 through like resistors 14 and 15 which are sufficiently large so that the surface electrodes will each assume a potential dependent upon the current flow in its earth circuit and not merely upon the potential of the source of current 13.

The electrode in the well bore is connected to the other side of the battery 13 and is adapted to be raised and lowered in the well. As this is done a current is established between surface electrode 10 and the well bore electrode 12 and also between the surface electrode 11 and well bore electrode 12. The magnitude of these currents and hence the potential of the electrodes is dependent upon the earth structure intervening. If the structure on both sides of the well bore is symmetrical, the effect on both circuits will be the same; the potential of surface electrodes 10 and 11 will be identical; and the current fields between these electrodes and the well bore electrode will be identical. Any asymmetry will cause a corresponding asymmetry in the current fields.

This symmetry or asymmetry can be determined by direct comparison of the potentials of the two surface electrodes 10 and 11 but such a method is not entirely satisfactory because, due to the current carried by the electrodes, polarization occurs on their surfaces and this prevents satisfactory direct comparison of their potentials. Instead, it is preferred to utilize a second pair of surface electrodes 16 and 17 which are respectively positioned near the first mentioned surface electrodes 10 and 11 and which may be termed the measuring electrodes. Further, instead of determining the potential of each of these electrodes separately and comparing the results, a direct comparison of their potential may be obtained by connecting a galvanometer or voltmeter 18 directly between them. Thus as the electrode in the well bore is raised and lowered an indication may constantly be had on the galvanometer 18 of the state of symmetry of the formations on opposite sides of the well bore. Thus, if the well bore electrode 12 is started at the entrance to the well bore and moves slowly downward and the galvanometer 18 remains at center, for say, 1000 feet, the indication is that the formations are symmetrical to that depth, and, then, if the galvanometer indicates that the potential of electrode 16 has become higher than that of electrode 17, the indication is that some of the lower more highly conductive strata slopes upward on the side of measuring electrode 17, thus reducing the resistance in the path of that current field and consequently reducing the potential of the measuring electrode 17, relative to measuring electrode 16.

As shown in Figure 2 the same type of system may be applied to the determination of dip by using two pairs of surface electrodes similar to electrodes 10 and 11 but with the pairs placed at right angles to each other. Thus power distributing surface electrodes 20 and 21 may be provided at right angles to a second pair of power distributing surface electrodes 22 and 23. Four measuring electrodes 24, 25, 26 and 27 may also be provided and the opposite electrodes of this series can be connected in pairs so that there will be two indications which can be compared with each other to ascertain the direction, azimuth and extent of the dip. An electrode 28 will be provided in the well bore as before. The various connections are not shown between the electrodes in Figure 2, in order to avoid confusion, but they will be similar to those shown in Figure 1.

We claim:

1. A method of geophysical exploration that comprises establishing a plurality of electrical current fields between an electrode in a well bore and a plurality of spaced electrodes on the surface of the earth and measuring the potential of points on the earth's surface in the vicinity of the surface electrodes as indications of the configuration of the current fields and hence of the arrangement of the subsurface strata.

2. An apparatus for geophysical exploration that comprises an electrode adapted to be located in a well bore, a plurality of electrodes adapted to be located at spaced points on the surface around said well bore, means for maintaining an electrical potential difference between the electrodes within the well bore and the electrodes on the surface, a plurality of measuring electrodes adapted to make electrical contact with the earth at points between the surface electrodes and the electrode in the well bore, and means to measure the difference in potential between said measuring electrodes.

3. An apparatus for geophysical exploration that comprises an electrode adapted to be placed in a well bore, means to raise and lower said electrode, means to indicate the position of the electrode in the well bore, electrodes adapted to be spaced about said well bore on the surface of the earth, means to apply a potential between said surface electrodes and said electrode in the well bore, measuring electrodes adapted to make electrical contact with the surface of the earth in the vicinity of the surface electrodes and means for measuring the difference in potential between at least two of said measuring electrodes.

4. A device as described in claim 3 in which recording means are provided to record the depth of operation of the electrode in the well bore in correlation with a recording of the measurements of difference in potential between the measuring electrodes.

5. A method of geophysical exploration that comprises establishing a plurality of distinct non-coincidental electrical fields between an electrode within an earth opening and a plurality of oppositely electrically charged electrodes in the geological formation being investigated, simultaneously measuring potentials in said fields within the formation, and comparing the measurements to determine the configuration of the fields and hence of the character of the geological formation.

ELIHU HENRY COOLEY.
JACOB NEUFELD.